United States Patent [19]

Brook

[11] Patent Number: 5,071,145
[45] Date of Patent: Dec. 10, 1991

[54] MASTER JAW ASSEMBLY
[75] Inventor: Geoff Brook, Loves Park, Ill.
[73] Assignee: Energy Dynamics, Inc., Loves Park, Ill.
[21] Appl. No.: 634,095
[22] Filed: Dec. 24, 1990
[51] Int. Cl.⁵ .............................................. B23B 31/20
[52] U.S. Cl. .................................. 279/1 A; 279/46 R; 279/123
[58] Field of Search ..................... 279/1 R, 1 A, 46 R, 279/50, 51, 123

[56] References Cited
U.S. PATENT DOCUMENTS

| | | | |
|---|---|---|---|
| 2,398,924 | 4/1946 | Daniels | 279/46 R |
| 3,746,353 | 7/1973 | Allen | 297/1 A X |
| 4,795,175 | 1/1989 | Babb et al. | 279/1 A X |
| 4,884,821 | 12/1989 | Dietrich | 279/51 X |
| 4,943,071 | 7/1990 | Srebot et al. | 279/46 R X |

FOREIGN PATENT DOCUMENTS

| | | | |
|---|---|---|---|
| 283806 | 11/1988 | Japan | 279/1 A |
| 7904 | 10/1988 | PCT Int'l Appl. | 279/1 A |

Primary Examiner—Steven C. Bishop
Attorney, Agent, or Firm—Thomas R. Vigil

[57] ABSTRACT

The master jaw assembly comprises at least three jaw members adapted to be mounted to a chuck, a collet adapter which is recieved within the jaw members and in an opening in the chuck, and a selected collet received and releasably fixed within the collet adapter.

12 Claims, 4 Drawing Sheets

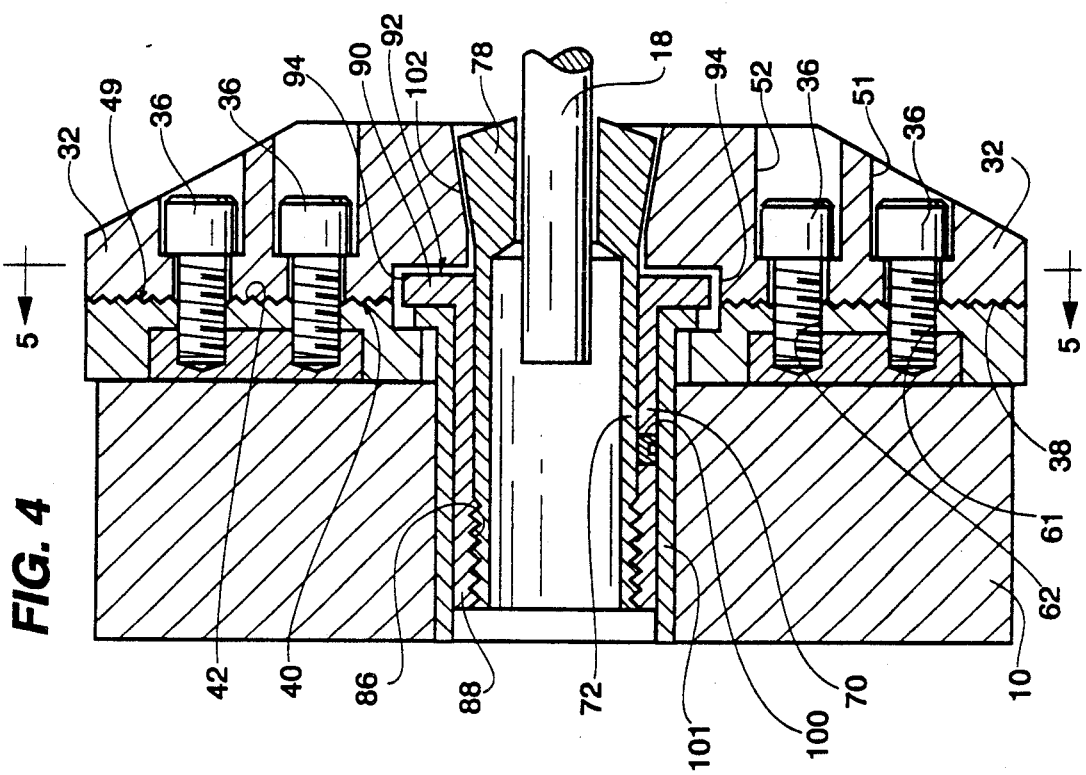
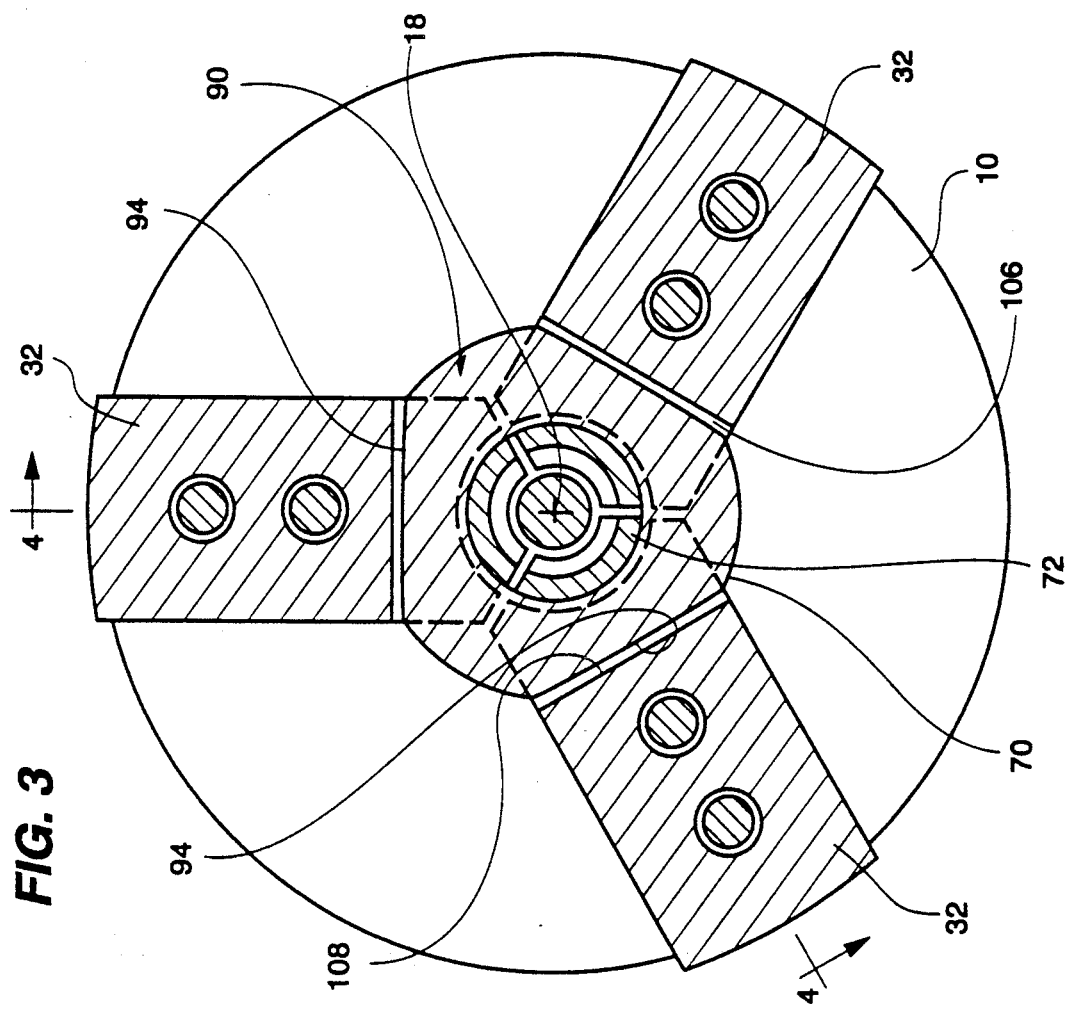

MASTER JAW ASSEMBLY

BACKGROUND OF THE INVENTION

1. Field of the Invention

The present invention relates to a jaw assembly mounted on a chuck of a lathe for facilitating quick and easy changeover of the jaw assembly for receiving a workpiece of one small diameter to a workpiece of another small diameter such as workpiece having diameters between 1/64" and 1⅛".

2. Description of the related art including information disclosed under 37 CFR Sections 1.97-1.99

Heretofore it has been a common practice when changing over a jaw assembly for receiving a workpiece of one small diameter to a workpiece of another small diameter to mount soft jaw members on a chuck of a lathe, to move the jaws inwardly until the inner ends thereof are in contact with each other and then to drill or bore out the point of intersection of the jaw members a desired diameter bore so that each jaw member will have a concave partially cylindrical surface for mating with and gripping a workpiece positioned within the jaw members.

This procedure is time consuming e.g. it can take up to several hours and the soft jaws are often gradually consumed and eventually discarded.

As will be described in greater detail hereafter the master jaw assembly of the present invention provides a simple, quick and relatively inexpensive means for converting the master jaw assembly for receiving any desired small diameter workpiece such as in the range from 1/64" diameter to 1⅛" diameter.

SUMMARY OF THE INVENTION

According to the present invention there is provided a master jaw assembly comprising at least three jaw members adapted to be mounted to a chuck, a collet adapter which is received within said jaw members and in an opening in the chuck, and a selected collet received and releasably fixed within said collet adapter.

Preferably the collet has a thicker in cross-section, outer end portion having a central bore and a radially outwardly outer tapered surface and the jaw members have an inner partially conical surface sized to engage the outer tapered surface of the collet outer end portion when the jaw members are moved radially inwardly.

Also preferably, the jaw member has a radially inwardly and longitudinally inwardly cut away area forming an axially inwardly facing shelf and a radially inwardly facing shoulder and the collet adapted has an outer end flange having an outer axially facing surface adapted to abut against the shelf of each of the jaw members and having at least three flats each flat being positioned opposite one of the shoulders to limit inward movement of the jaw members to prevent radially inwardly over travel of the jaw members thereby to prevent damage to the collet.

BRIEF DESCRIPTION OF THE DRAWINGS

FIG. 3 is a vertical sectional view through the master jaw assembly and the chuck shown in FIG. 1 and is taken along Line 3—3 of FIG. 1.

FIG. 4 is a sectional view through the master jaw assembly shown in FIG. 3 and is taken along Line 4—4 of FIG. 3.

DESCRIPTION OF THE PREFERRED EMBODIMENT(S)

Figure 1:
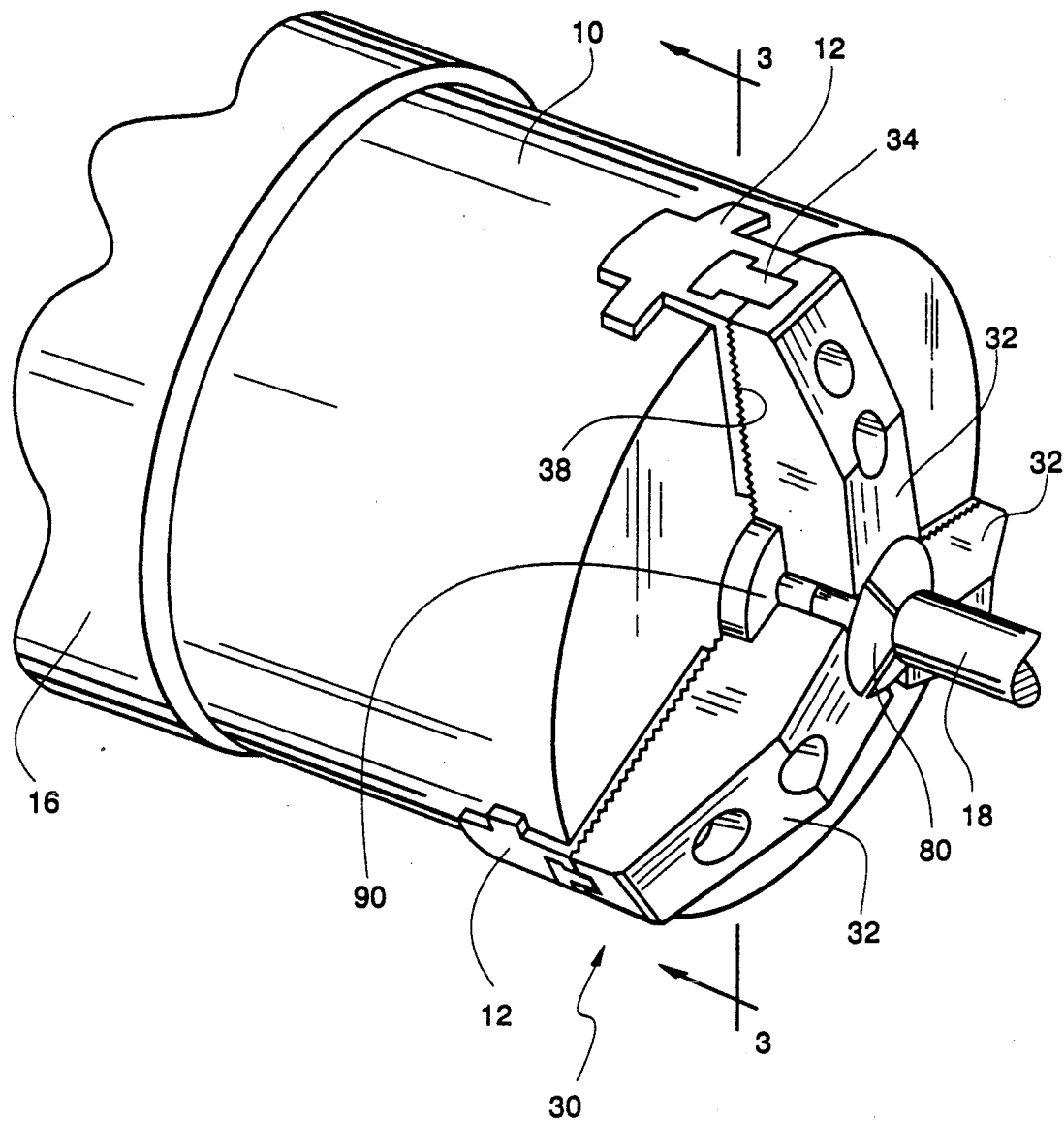
FIG. 1 is a perspective view of the master jaw assembly of the present invention mounted on a chuck of a lathe.

Referring now to the drawings in greater detail, there is illustrated in FIG. 1 a conventional cylindrical chuck 10 having three jaw mounting members 12 spaced 120 degrees from each other and mounted in the chuck for radial inward and outward movement. The chuck 10 is typically mounted on a machine tool such as a lathe 16 and, by means of a hydraulic ramp system (not shown) in the chuck 10, the jaw mounting members 12 are caused to move radially inwardly or outwardly to cause conventional jaws (not shown) mounted on the jaw mounting members 12 to engage a cylindrical workpiece 18.

Typically, for small diameter workpieces, it is common to mount soft jaw members on the jaw mounting members 12 to move the inner ends of these jaw members into contact with each other, and then to drill and bore a hole through the ends of the soft jaw members. The drilled bore has the diameter of the workpiece which the soft jaw members are intended to engage.

This is a time consuming and relatively costly procedure for creating jaw members having ends which are sized to fit a specific, small diameter workpiece.

Figure 2:
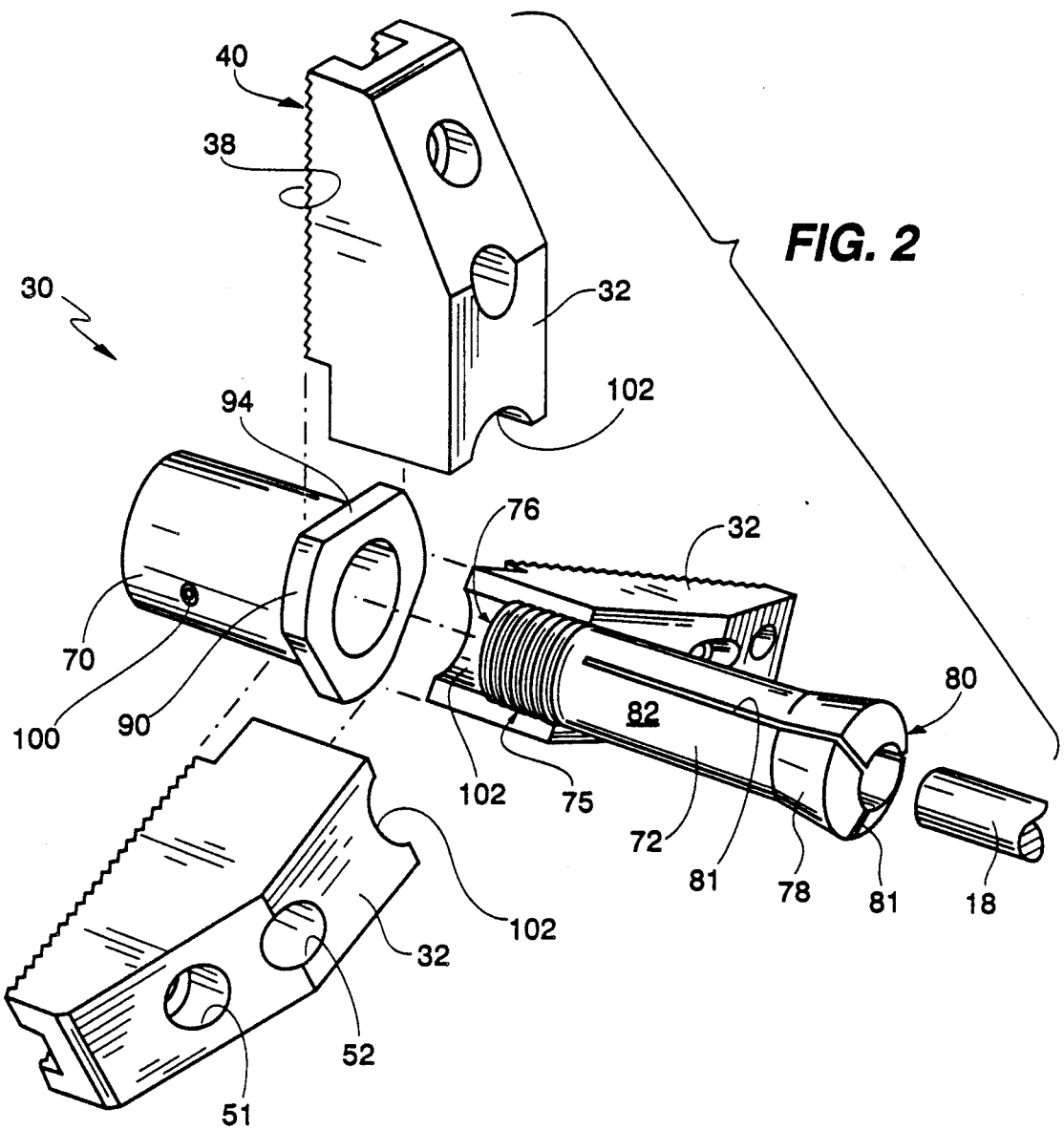
FIG. 2 is an exploded perspective view of the master jaw assembly of the present invention.

According to the teachings of the present invention, such soft jaw members are replaced by a master jaw assembly 30 which is shown mounted on the jaw mounting members 12, in FIG. 1, with a workpiece 18 mounted therein and which is shown in an exploded perspective view in FIG. 2.

As shown in FIG'S. 1 and 2, the master jaw assembly 30 includes three jaw members 32, each of which is fixed by a T-nut 34 and two bolts 36 to one of the jaw mounting members 12.

As shown in FIG. 4, each jaw member 32 has serrations 38 on an inner surface 40 thereof which mate with serrations 42 on the outer surface 44 of each jaw mounting member 12. Further each jaw member 32 has two countersunk throughbores 51, 52 therein, each for receiving one of the bolts 36 which is then threadedly received in a threaded bore 61 or 62 in one of the jaw mounting members 12 and/or in one of the T-nuts 34.

As best shown in FIG. 2, the master jaw assembly 30 further includes a collet adapter 70 and a plurality of collets, one of which, collet 72, is shown in FIG. 2. The collets, such as the collet 72 are typically staple items of commerce that one can purchase for use in a lathe.

Each collet, such as the collet 72, is generally cylindrical in shape and has a stepped throughbore of a predetermined diameter which typically ranges from 1/64" to 1⅛". As shown, the collet 72 has threads 75 on its inner end 76 and has an outwardly tapered or flared thicker end portion 78 at its outer end 80. The collet 72 further has three radially and longitudinally extending slots 81, therein extending through the collet 72 between the throughbore 74 and the outer peripheral surface 82 of the collet and longitudinally inwardly from the outer end 80 of the collet 72 to a position just forward of the threaded inner end portion 75.

As shown in FIG'S. 1 and 2, the collet 72 is received within the collet adapter 70 and all the collets that are used with the master jaw assembly 30 have the same outer diameter and different inner diameters for accommodating workpieces of different outer diameters such as the workpiece 18.

Referring now to FIG. 4, when using the master jaw assembly 30, the collet 72 is threaded into the collet adapter 70 which has internal threads 86 at an inner end 88 thereof. The collet adapter 70 also has a flange 90 at the forward end 92 thereof and three equally spaced flats 94 are formed on the outer periphery 96, thereof.

To prevent the collet 72 from unthreading from the collet adapter 70 a transverse threaded bore 98 is provided in the cylindrical wall of the collet adapter 70 and an Allen screw 100 is received therein which can be tightened against the outer surface 82 of the collet 72 as shown in FIG. 4.

As shown in FIG. 4, each of the jaw members 32 has a partially conical inner end surface 102 adapted to mate with conical outer surface 104 of the tapered outer end portion 78 of the collet 72. Also, each jaw member 32 has a longitudinally inwardly and radially inwardly cut away area which forms an axially facing shelf 106 and a radially inwardly facing shoulder 108. Each shoulder 108 is positioned outwardly from one flat 94 on the flange 90 of the collet adapter 72 as shown in FIG. 3.

Figure 6:
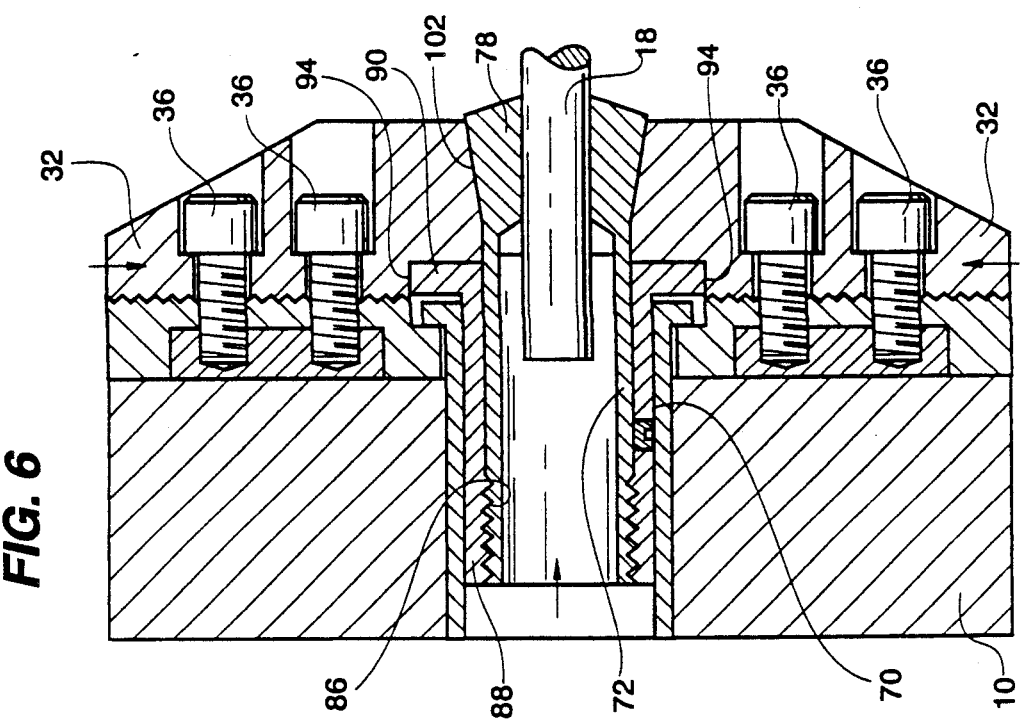
FIG. 6 is a sectional view through the master jaw assembly shown in FIG. 5 and is similar to the view shown in FIG. 4 but shows the jaw members moved radially inwardly.
Figure 5:
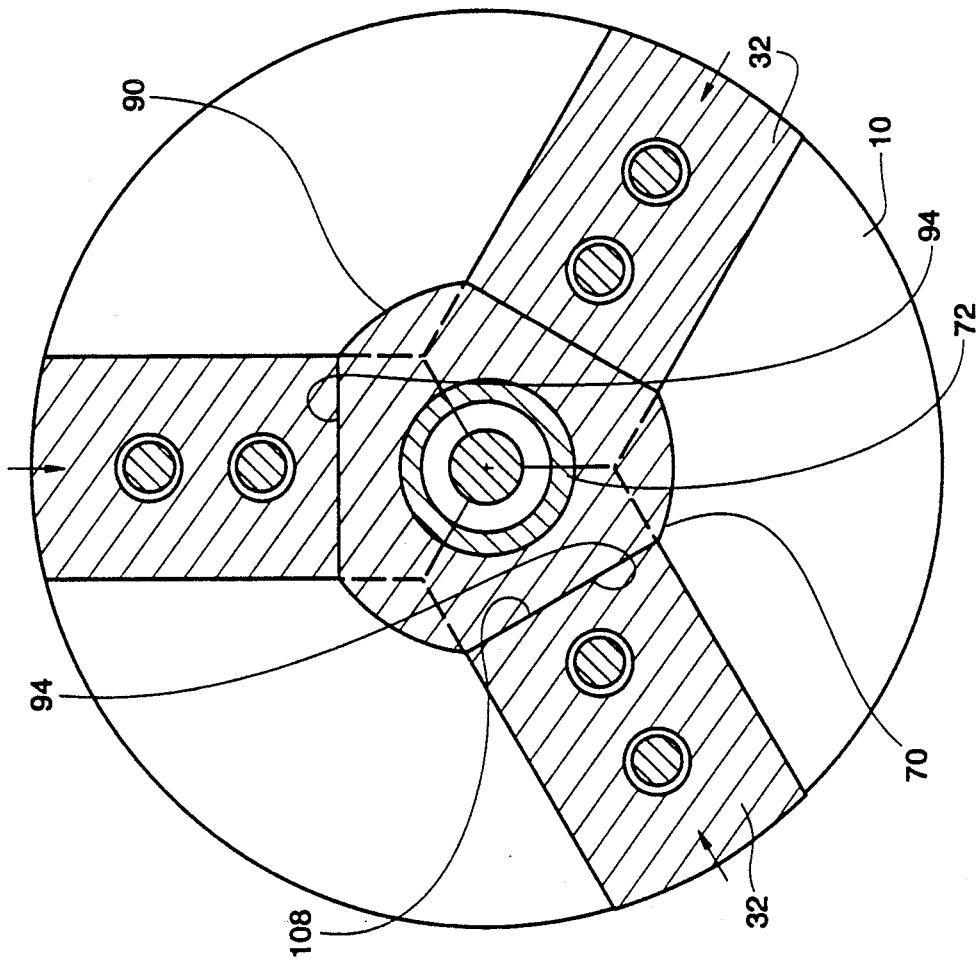
FIG. 5 is a vertical sectional view similar to the view shown in FIG. 3 and is generally a sectional view taken along Line 5—5 of FIG. 4 after three jaw members of the system have been moved radially inwardly.

After the master jaw assembly 30 has the collet 72 mounted in the collet adapter 70 which is received in an internal sleeve 101 of the chuck 10, as shown in FIG'S. 3 and 4, the cylindrical workpiece 18 is inserted in the collet 72 as shown in FIG. 4, and the jaw members 32 are moved radially inwardly toward the outer end portion 78 of the collet 70 to engage the tapered outer surface 102 on the outer end portion 78, the collet 72, and force the thicker outer end portion 78 of the collet 72 against the workpiece 18 as shown in FIG. 6. This will urge the collet 72 longitudinally outwardly bringing the outer axially facing face 110 of the flange 90 of the collet 72 against the inner shelf 106 of each of the jaw members 12 and bringing the inner shoulder 108, of each jaw member 12 close to, but not in engagement with one of the flats 94 on the flange 90 of the collet adapter 70.

In this way, the collet 72 and collet adapter 70 are locked radially and longitudinally by, and relative to, the jaw members 32.

It will be noted that the flats 94 on the flange 90 of the collet adapter 70, prevent overtravel of the jaw members 12 inwardly against the collet 72 thereby preventing accidental breakage of the collet 72.

From the foregoing description it will be readily apparent that the master jaw assembly 30 of the present invention provides a number of advantages some of which have been described above and others of which are inherent in the invention. In particular, the master jaw assembly 30 can be refitted quickly and easily for receiving another small diameter workpiece of a different diameter than the workpiece 18 simply by moving the jaw members 32 radially outwardly pulling the collet 72 and collet adapter 70 from its slidably mounted position within the internal sleeve 101 of the chuck 10, releasing the Allen screw 100 unthreading the collet 72, threading in a new collet 72, tightening the Allen screw 100, slidably positioning the collet adapter 70 in the internal sleeve 101, and moving the jaw members 32 inwardly into engagement with the outer end portion 78 of the collet 72 with the flats 94 on the flange 90 of the collet adapter 70 preventing overtravel.

Also, it will be apparent that modifications can be made to the master jaw assembly 30 without departing from the teachings of the invention. Accordingly, the scope of the present invention is only to be limited as necessitated by the accompanying claims.

I claim:

1. A master jaw assembly comprising at least three jaw members adapted to be mounted to a chuck, a collet adapted which is received within said jaw members and in an opening in the chuck, and a selected collet received and releasably fixed within said collet adapter, said collet having a thicker in cross-section, outer end portion with a central bore therethrough and with a radially outwardly outer tapered surface and said jaw members having an inner partially conical surface sized to engage said outer tapered surface of said collet outer end portion when said jaw members are moved radially inwardly.

2. The jaw assembly of claim 1 wherein each jaw member has a radially inwardly and a longitudinally inwardly cut away area forming an axially inwardly facing shelf and a radially inwardly facing shoulder, and said collet adapted has an outer end flange having an outer axially facing surface adapted to abut against said shelf of each of said jaw members and having at least three flats, each flat being positioned opposite one of said shoulders to limit it inward movement of said jaw members to prevent radially inwardly over travel of said jaw members thereby to prevent damage to said collet.

3. The jaw assembly of claim 1 including a plurality of collets each having a stepped bore therein with the smallest diameter stepped bore portion of each collet being sized to received a work piece of a selected diameter.

4. The jaw assembly of claim 3 wherein said smallest diameter stepped bore portion of each of said collets has a 30 diameter between 1/64" and 1⅛".

5. The jaw assembly of claim 1 wherein the inner end of each collet is threaded and said collet adapter has a throughbore for receiving said collet and is threaded on the inner surface of said throughbore at the inner end of said collet adapter whereby said collet can be threaded into said collet adapter.

6. The jaw assembly of claim 1 wherein said collet adapter has a throughbore therein for receiving said collet and a transverse threaded bore through the cylindrical wall of said collet adapter and an screw received in said threaded bore adapted to be tightened against said collet for holding said collet to said collet adapter.

7. A master jaw assembly comprising at least three jaw members to be mounted to a chuck, a collet adapter which is received within said jaw members and in an opening in the chuck, and a selected collet received and releasably fixed within said collet adapter, each jaw member having a radially inwardly and a longitudinally inwardly cut away area forming an axially inwardly facing shelf and a radially inwardly facing shoulder, and said collet adapter having an outer end flange which has an outer axially facing surface adapted to abut against said shelf of each of said jaw members and which has at least three flats, each flat being positioned opposite one of said shoulders to limit inward movement of said jaw members to prevent radially inwardly over travel of said jaw members thereby to prevent damage to said collet.

8. The jaw assembly of claim 7 wherein said collet has a thicker in cross-section, outer end portion having a central bore and a radially outwardly outer tapered surface and said jaw members have an inner partially conical surface sized to engage said outer tapered surface of said collet outer end portion when said jaw members are moved radially inwardly.

9. The jaw assembly of claim 7 including a plurality of collets each having a stepped bore therein with the smallest diameter stepped bore portion of each collet being sized to receive a work piece of a selected diameter.

10. The jaw assembly of claim 9 wherein said smallest diameter stepped bore portion of each of said collets has a diameter between 1/64" and 1⅛".

11. The jaw assembly of claim 7 wherein the inner end of each collet is threaded and said collet adapter has a throughbore for receiving said collet and is threaded on the inner surface of said throughbore at the inner end of said collet adapter whereby said collet can be threaded into said collet adapter.

12. The jaw assembly of claim 7 wherein said collet adapter has a throughbore therein for receiving said collet and a transverse threaded bore through the cylindrical wall of said collet adapter and a screw received in said threaded bore adapted to be tightened against said collet for holding said collet to said collet adapter.

* * * * *